(12) United States Patent
Adams et al.

(10) Patent No.: US 11,979,791 B2
(45) Date of Patent: May 7, 2024

(54) LOCAL COMMUNICATION

(71) Applicant: The Government of the United States, as represented by the Secretary of the Army, Washington, DC (US)

(72) Inventors: Michael Adams, Norman, OK (US); William Toth, Ocean, NJ (US); Matthew Lazzaro, Churchville, MD (US); Todd Lutton, New Windsor, MD (US); Michael Neuman, Vashon, WA (US); Diana Neuman, Vashon, WA (US); Stanley Fong, Hazlet, NJ (US)

(73) Assignee: The Government of the United States, as represented by the Secretary of the Army, Washington, DC (US)

( * ) Notice: Subject to any disclaimer, the term of this patent is extended or adjusted under 35 U.S.C. 154(b) by 210 days.

(21) Appl. No.: 17/504,775

(22) Filed: Oct. 19, 2021

(65) Prior Publication Data
US 2023/0124363 A1 Apr. 20, 2023

(51) Int. Cl.
*H04W 4/02* (2018.01)
*H04L 1/00* (2006.01)
*H04W 8/22* (2009.01)
*H04W 72/0453* (2023.01)

(52) U.S. Cl.
CPC ........... *H04W 4/025* (2013.01); *H04L 1/0003* (2013.01); *H04W 8/22* (2013.01); *H04W 72/0453* (2013.01)

(58) Field of Classification Search
CPC ......... H04W 4/025; H04W 8/12; H04W 8/22; H04W 72/0453; H04L 1/0003
See application file for complete search history.

(56) References Cited

U.S. PATENT DOCUMENTS

2018/0167972 A1* 6/2018 Egner ................. H04W 72/541
2023/0199644 A1* 6/2023 Luan ........................ H04B 7/15
370/311

OTHER PUBLICATIONS

WO/2019/013948 A1 (Year: 2019).*

* cited by examiner

*Primary Examiner* — Siu M Lee
(74) *Attorney, Agent, or Firm* — Ronald Krosky

(57) ABSTRACT

Various embodiments that relate to local communication are discussed. A radio from one geographical area can enter a communication environment of a different geographical area. However, if the radio still functions consistent with the previous geographical area, then the radio will not blend into the new geographical area. Therefore, the radio can alter operational characteristics when entering the new geographical area such that the radio blends into the new geographical area from a radio frequency perspective.

16 Claims, 10 Drawing Sheets

LOCAL COMMUNICATION

GOVERNMENT INTEREST

The innovation described herein may be manufactured, used, imported, sold, and licensed by or for the Government of the United States of America without the payment of any royalty thereon or therefor.

BACKGROUND

Worldwide travel allows individuals from different geographical areas to enter new locations, such as from a user's home area to a vacation area. Along with worldwide travel, many of these individuals bring electronic devices employed for communication, such as a radio. If the radio operates in the user's home, then the radio can function with characteristics consistent with the home area. When the radio enters the vacation area, the radio may continue to function with the characteristics consistent with the home area and therefore not blend in with the vacation area.

SUMMARY

In one embodiment, a system comprises an analysis component and a selection component. The analysis component can be configured to perform an analysis on a communication situation for a geographical area. The selection component can be configured to select an operational setting for a radio based, at least in part, on a result of the analysis. The radio can operate with the operational setting while being physically located in the geographical area.

In another embodiment, a method can comprise determining an initial communication situation for a geographical area and analyzing the initial communication situation to produce an initial analysis result. The method can also comprise selecting an initial operational setting for a radio based, at least in part, on the initial analysis result and communicating the initial operational setting to the radio. In addition, the method can comprise determining a subsequent communication situation for the geographical area and analyzing the subsequent communication situation to produce a subsequent analysis result. Further, the method can comprise selecting a subsequent operational setting for the radio based, at least in part, on the subsequent analysis result and communicating the subsequent operational setting to the radio.

In yet another embodiment, a system can comprise a reception component configured to obtain an operational setting set for a radio that is based, at least in part, on a communication situation for a geographical area. The system can also comprise a function component configured to implement the operational setting set upon the radio. The reception component and the function component can be resident upon the radio.

BRIEF DESCRIPTION OF THE DRAWINGS

Incorporated herein are drawings that constitute a part of the specification and illustrate embodiments of the detailed description. The detailed description will now be described further with reference to the accompanying drawings as follows:

Multiple figures can be collectively referred to as a single figure. For example, FIG. 3 illustrates two subfigures—FIG. 3A and FIG. 3B. These can be collectively referred to as 'FIG. 3.'

DETAILED DESCRIPTION

Figure 1:
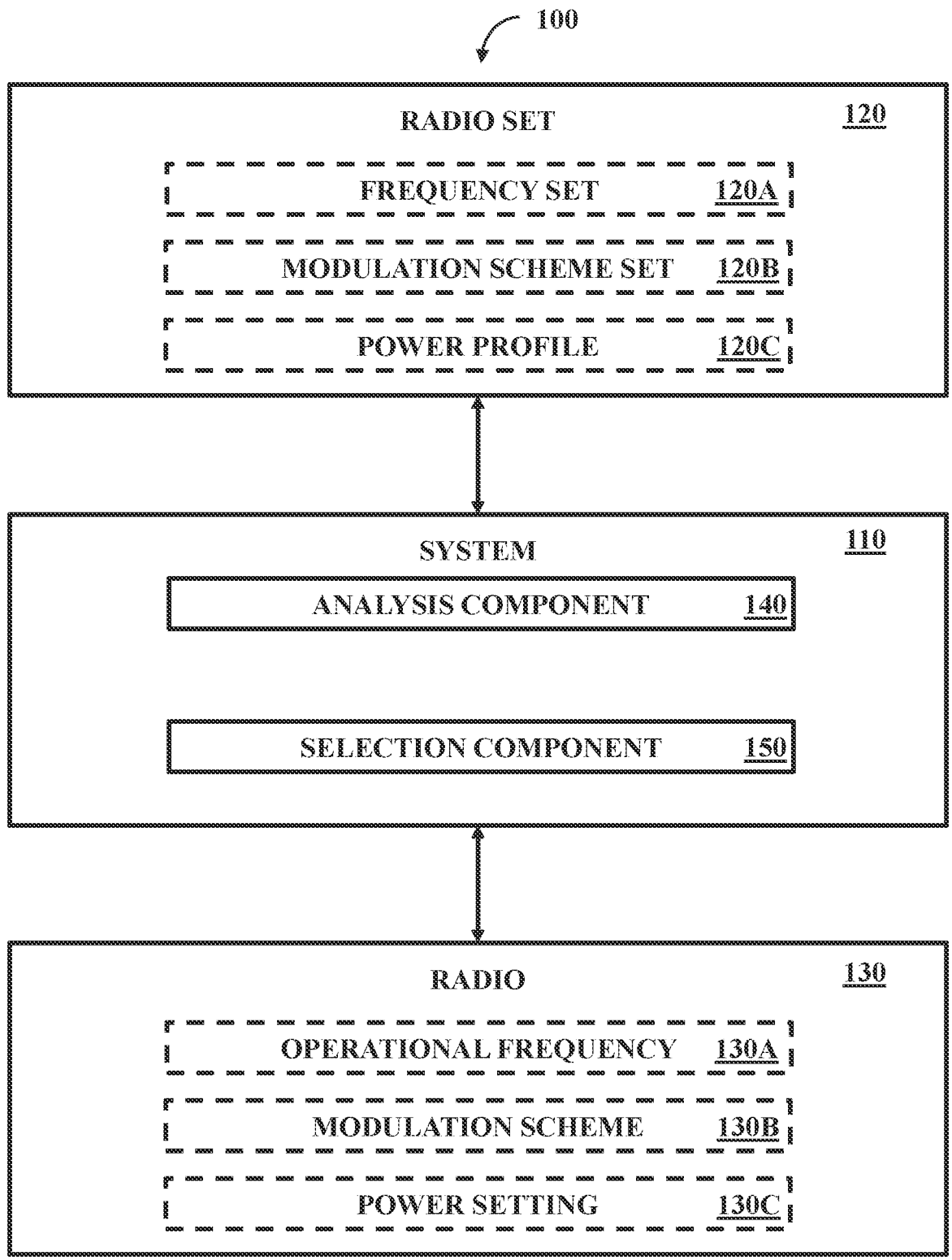
FIG. 1 illustrates one embodiment of an environment with a system, a radio set, and a radio.

A radio from another location can enter a local radio environment. An operator of the radio can desire for the radio to operate as though it is part of the local radio environment. To achieve this result, the radio can identify, select and function with operational properties in line with those of the local radio environment.

The following includes definitions of selected terms employed herein. The definitions include various examples. The examples are not intended to be limiting.

"One embodiment", "an embodiment", "one example", "an example", and so on, indicate that the embodiment(s) or example(s) can include a particular feature, structure, characteristic, property, or element, but that not every embodiment or example necessarily includes that particular feature, structure, characteristic, property, or element. Furthermore, repeated use of the phrase "in one embodiment" may or may not refer to the same embodiment.

"Computer-readable medium", as used herein, refers to a medium that stores signals, instructions and/or data. Examples of a computer-readable medium include, but are not limited to, non-volatile media and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, other optical medium, a Random Access Memory (RAM), a Read-Only Memory (ROM), a memory chip or card, a memory stick, and other media from which a computer, a processor or other electronic device can read. In one embodiment, the computer-readable medium is a non-transitory computer-readable medium.

"Component", as used herein, includes but is not limited to hardware, firmware, software stored on a computer-readable medium or in execution on a machine, and/or combinations of each to perform a function(s) or an action(s), and/or to cause a function or action from another component, method, and/or system. Component may include a software controlled microprocessor, a discrete component, an analog circuit, a digital circuit, a programmed logic device, a memory device containing instructions, and so on. Where multiple components are described, it may be possible to incorporate the multiple components into one physical component or conversely, where a single component is described, it may be possible to distribute that single component between multiple components.

"Software", as used herein, includes but is not limited to, one or more executable instructions stored on a computer-readable medium that cause a computer, processor, or other electronic device to perform functions, actions and/or behave in a desired manner. The instructions may be embodied in various forms including routines, algorithms, modules, methods, threads, and/or programs, including separate applications or code from dynamically linked libraries.

FIG. 1 illustrates one embodiment of an environment 100 with a system 110, a radio set 120, and a radio 130. The system 110 can comprise an analysis component 140 and a selection component 150. The analysis component 140 can be configured to perform an analysis on a communication situation for a geographical area, such as a geographical area of the radio set 120 and the radio 130. The selection component 150 can be configured to select an operational setting for a radio based, at least in part, on a result of the analysis. The radio 130 can operate with the operational setting while being physically located in the geographical area.

In one example, the radio 130 can be manufactured and tested in the United States. The radio 130 can function with—as example operational settings—an operational frequency 130A (e.g., one or more frequencies), modulation scheme 130B (e.g., one or more schemes), and power setting 130C (e.g., one or more settings). The operation settings can be based on what is discovered as being utilized within a sampled ambient spectrum by the analysis component 140 and then decided upon by the selection component 150. When in the United States, these operational settings can be consistent with other radios functioning in the United States (an example of the radio set 120).

If the radio 130 is shipped to Tanzania, the radio 130 may be out of line with radios functioning in Tanzania (another example of the radio set 120). Therefore, if a party were to evaluate radios in Tanzania, then the party could quickly identify the United States radio as a foreign radio. As an example, due to different power availability and different terrain, local radios from Tanzania could operate with different power settings than those in the United States. If the radio 130 operates with the United States power settings, the radio 130 would be easily identifiable to one that does a geographical power scan as clearly one radio, the radio 130, operates differently than the local radios, the radio set 120 from Tanzania.

The system 110 can, in one embodiment, implement upon the radio 130. When the radio 130 enters Tanzania from the United States, the analysis component 140 can scan the geographical area (e.g., the area where the radio is with a range of as far as the radio 130 can scan). With this scan, the analysis component 140 can gather information about the radio set 120—the local radios operating in Tanzania. The analysis component 140 can process the information to determine operational characteristics of the radio set 120. Example operational characteristics of the radio set 120 can include, but not be limited to, a frequency set 120A (e.g., single channel operation), a modulation scheme set 120B (e.g., multiple schemes available through waveform hopping), and a power profile 120C. The selection component 150 can select the operational settings of the radio 130 based, at least in part, on the operational characteristics of the radio set 120.

In one example, one operational setting of the radio 130 can be the operational frequency 130A. The frequency set 120A used by the radio set 120 can comprise an upper frequency level and a lower frequency level to form a radio set frequency range, comprise a number of distinct operating frequencies, or comprise a number of non-contiguous frequency ranges. The selection component 150 can select the operational frequency 130A (e.g., one or more frequencies) to complement the frequency set 120A (e.g., in frequency and timing). The operational frequency 130A can complement the frequency set 120A by falling within the radio set frequency range. The operational frequency 130A can be lower than the upper frequency level of the frequency set 120A and higher than the lower frequency level of the frequency set 120A. Now, when one performs a geographical power scan of the area with the radio set 120 and the radio 130, the radio 130 appears to fit in, and thus appear to be part of the radio set 120, from a frequency standpoint.

Other examples include the modulation scheme 130B and power setting 130C. The analysis component 140 can determine the communication situation of the modulation scheme set 120B employed by the radio set 120 in Tanzania as well as the power profile 120C employed by the radio set 120 in Tanzania. Based on this, the selection component 150 can select the modulation scheme 130B to complement the modulation scheme set 120B and can select the power setting 130C to complement the power profile 120B (e.g., match in timing).

While discussed individually, the system 110 can determine multiple operational characteristics of the radio set 120 to detail the communication situation. The communication situation can comprise the parameters used in an environment. With this, the communication situation can comprise what frequency set is used by a radio set 120 within Tanzania, what modulation scheme set is employed by the radio set 120 within Tanzania, and what a power profile set is employed by the radio set 120 within Tanzania. The radio 130, not being part of the radio set 120, can be configured to appear as though it is part of the radio set 120 and thus blend in as a radio of Tanzania. With this, the operational setting can comprises an operational frequency 130A, a modulation scheme 130B, and a power setting 130C that complement the respective counterpart of the radio set 120.

Therefore, aspects disclosed herein can allow for non-obtrusive blending into an ambient radio frequency (RF) environment with the operational setting. When the system 110 enters the ambient RF environment, a sample component that can be part of the system 110 can sample the RF spectrum (e.g., through aperiodic sampling) and send this information to the analysis component 140 for analysis. Based on this, the selection component 150 can select operational setting (e.g., a parameter set), which can be a specific value (e.g., 300 Kilohertz (kHz)), specific values (e.g., 300 kHz, 422 kHz, and 550 kHz), a range of values (e.g., 200-400 kHz), or non-contiguous ranges of values (e.g., 220-333 kHz and 383 kHz-500 kHz).

Figure 2:
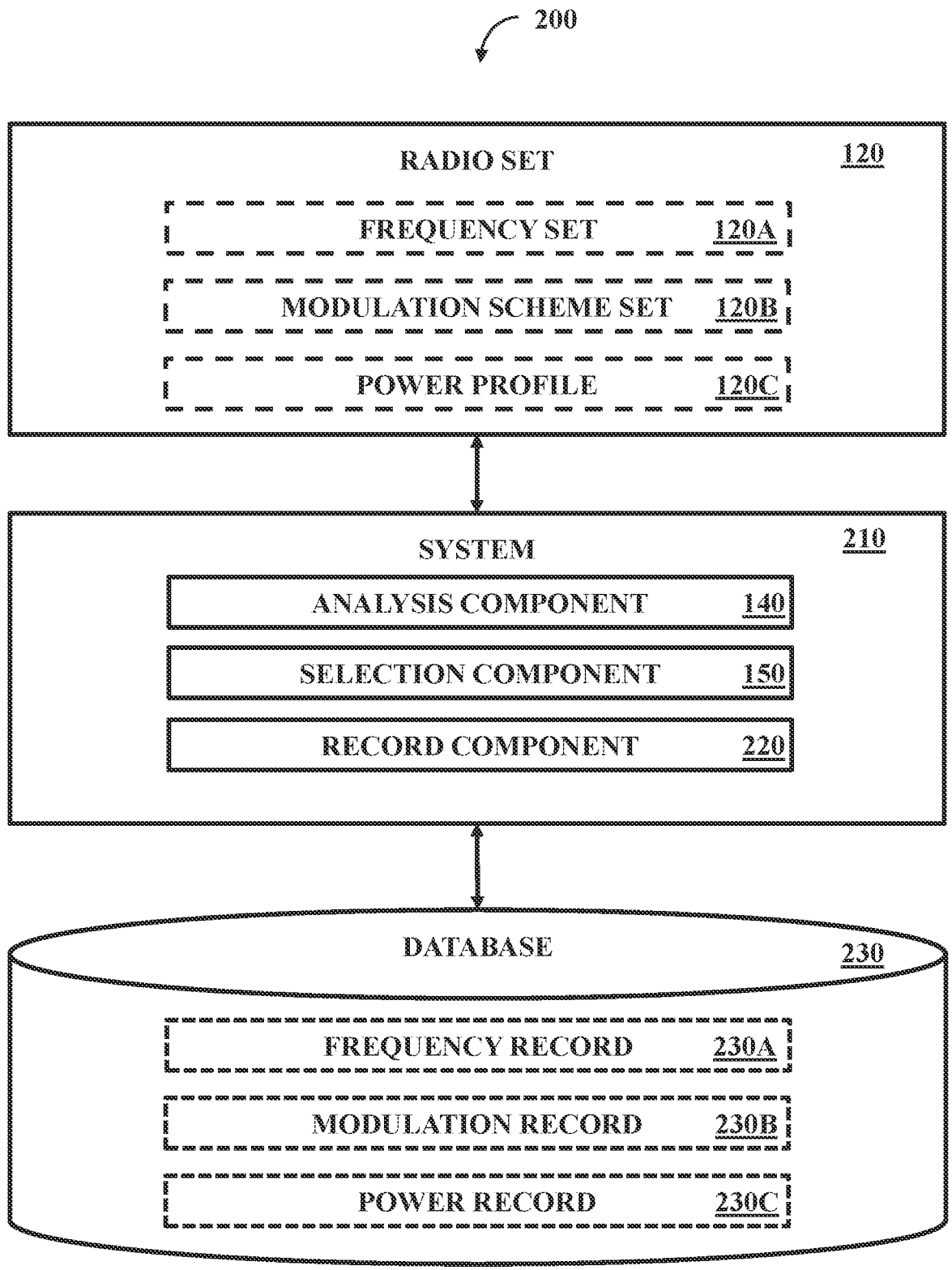
FIG. 2 illustrates one embodiment of an environment with a system, the radio set, and a database.

FIG. 2 illustrates one embodiment of an environment 200 with a system 210, the radio set 120, and a database 230. The system 210 can comprise a record component 220 along with the analysis component 140 and the selection component 150. The record component 220 can be configured to create a record of the communication situation for the geographical area.

In one example, the system 210 along with the record component 220, can enter the geographical area with the system 210 being part of a first radio. Continuing the example from above, this can be Tanzania. Upon entering Tanzania (e.g., being turned on while in Tanzania), the analysis component 140 can employ radio hardware to perform a scan to determine the frequency set 120A, the modulation scheme set 120B, and the power profile 120C as part of performing an analysis on a communication situation for Tanzania. The record component 220 can make a record of the communication situation. As an example, the record can comprise a frequency record 230A that indicates the frequency set 120A, a modulation record 230B that indicates the modulation scheme set 120B, and a power record 230C that indicates the power profile 120C. Additionally, the record can comprise the operational setting selections by the selection component 150.

The record component 220 can create the record in the database 230. The database 230 can be part of the first radio or in a centralized location. A second radio can access the database 230 to obtain the record. The second radio can employ the record for the operational setting of the second radio.

In one embodiment, the database 230 can retain a plurality of records. This plurality of records can provide details on communication situations detected across the world and beyond. Before being deployed, the second radio can download at least part of the plurality of records; this download can be of the entire plurality or of a portion, such as the area to which the second radio expects to be deployed.

Continuing the above example, the second radio can download a record about Tanzania. Before operating in Tanzania, the second radio can configure its settings to reflect the record about Tanzania. This way, when the second radio operates, it will appear to fit within the radio set 120 when the radio set 120 is a Tanzania radio set. In one example, when arriving in Tanzania and turning on, the second radio can identify its current Global Positioning System (GPS) coordinates, In one example, the system 210 can employ a cryptographic component. The record, the selected operational setting, and others can be subjected to cryptographic features. In one example, a cryptographic key can be used to determine a transition sequence. Further, pseudo echoes can be employed with orchestrated delay to obscure communication of the operational setting and/or radio communications themselves.

Figure 3A:
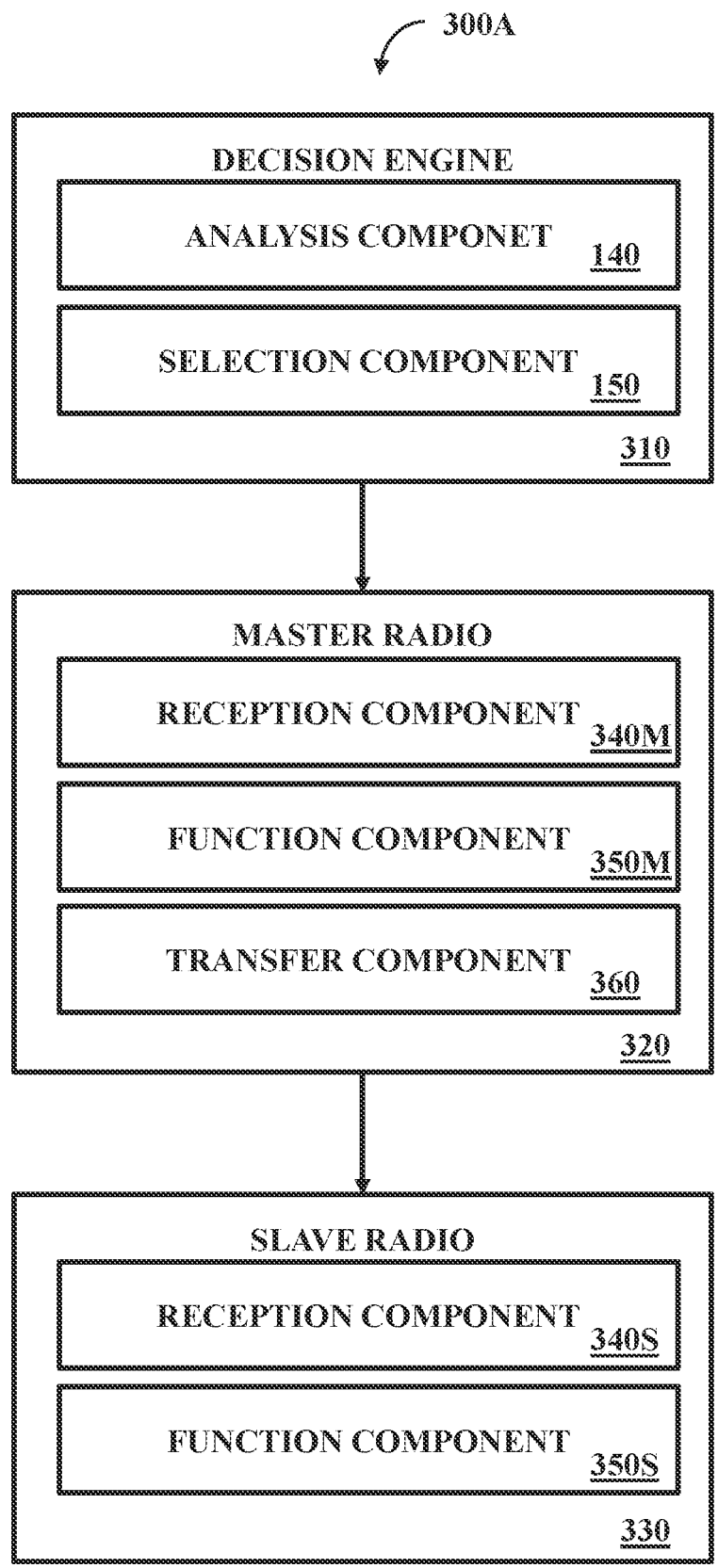
FIG. 3A illustrates one embodiment of an environment with a decision engine, a master radio, and a slave radio.
Figure 3B:
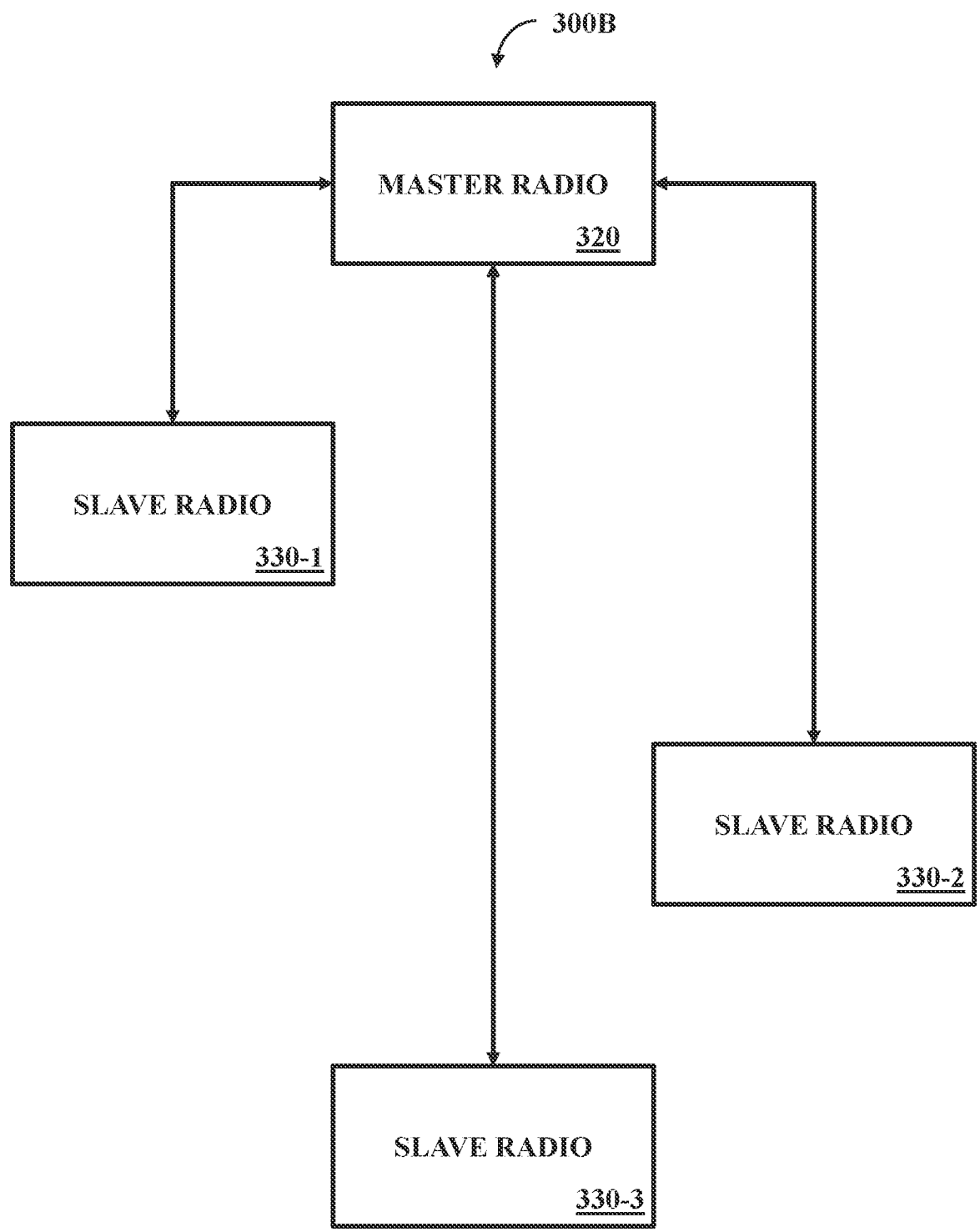
FIG. 3B illustrates one embodiment of an environment with the master radio and three slave radios.

FIG. 3A illustrates one embodiment of an environment 300A with a decision engine 310, a master radio 320, and a slave radio 330. FIG. 3B illustrates one embodiment of an environment 300B with the master radio 320 and three slave radios 330-1, 330-2, and 330-3. While three slave radios 330-1 through 330-3 are illustrated, more or fewer slave radios can be employed (e.g., slave radios 330-1 through 330-N, with N being a positive integer). The decision engine 310 can determine an operational setting set for a radio set that comprises at least one radio, such as the master radio 320 and at least one slave radio 330.

The reception component 340M configured to obtain an operational setting set for the master radio 320 that is based, at least in part, on a communication situation for a geographical area. The operational setting set can comprise a frequency set, a modulation scheme set, and a power settings set. The function component 350M can be configured to implement the operational setting set upon the master radio 320. The reception component 340M and the function component 350M can be resident upon the master radio 320.

The master radio 320 can employ the transfer component 360 to cause the master radio to transfer (e.g., wirelessly transmit) the operational setting set to a slave radio. The slave radio can implement the operational setting set. The environment 300B illustrates multiple slave radios 330-1 through 330-3 that receive the operational setting set from the master radio 320. While illustrated that the three slave radios 330-1 through 330-3 receive the operational setting set directly from the master radio 320, other configurations are possible, such as daisy chaining the operational setting set from the master radio 320 to the slave radio 330-1 and then from the slave radio 330-1 to the slave radio 330-3. There can also be synchronization between the master radio 320 and the slave radios 330-1 through 330-3 as well as among the slave radios 330-1 through 330-3 via employment of a timing signal. Similarly, operational settings can be relayed from the master radio 320 to other radios in any sequence based on proximity or other factor until slave radios have received the operation setting set. Further, while illustrated as singular radios, the master radio 320 and the slave radios 330-1 through 330-3 can each be radio networks of multiple radios.

The modulation scheme set can be a group of modulation schemes that complement the geographical area. Individual radios can waveform hop from scheme to scheme (e.g., in a pseudo-random nature). The hopping can be done locally (e.g., the slave radio 330-1 can determine when and to what waveform to hop) or from the master radio 320 (e.g., the master radio 320 directs when and/or to what waveform the slave radio 330-1 hops).

In one embodiment, the master and slave designations can be fluid. In one example, an initial setting can have the radio 320 as the master radio and the radio 330-1 as the slave radio. A decision can be made, such as through user input or an artificial intelligence component, to change which radio is the master. As a result of this, the radio 330-1 can become master and the radio 320 can become slave. In another example, a new radio can enter and the radio 320 can become slave to the new radio (e.g., with the slave radios 330-1 through 330-3 being on an equal tier with the radio 320 or becoming sub-slaves).

Figure 4:
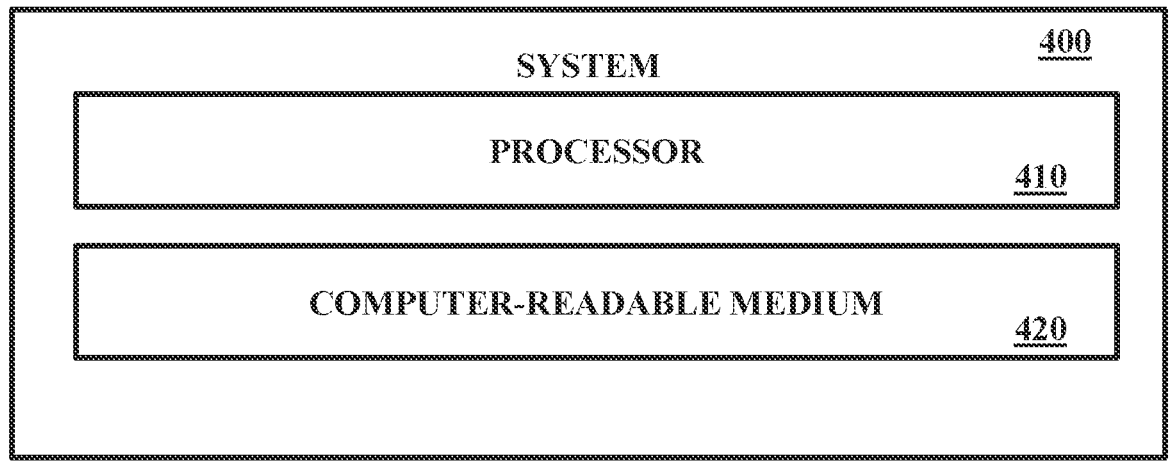
FIG. 4 illustrates one embodiment of a system comprising a processor and a computer-readable medium

FIG. 4 illustrates one embodiment of a system 400 comprising a processor 410 and a computer-readable medium 420 (e.g., non-transitory computer-readable medium). In one embodiment, the computer-readable medium 420 is communicatively coupled to the processor 410 and stores a command set executable by the processor 410 to facilitate operation of at least one component disclosed herein (e.g., the analysis component 140 of FIG. 1 or the cryptographic component discussed above). In one embodiment, at least one component disclosed herein (e.g., the selection component 150 of FIG. 1 or the sample component discussed above) can be implemented, at least in part, by way of non-software, such as implemented as hardware by way of the system 400. In one embodiment, the processor 410 and the computer-readable medium 420 are resident upon the radio 130 of FIG. 1. In one embodiment, the computer-readable medium 420 is configured to store processor-executable instructions that when executed by the processor 410, cause the processor 410 to perform at least part of a method disclosed herein (e.g., at least part of one of the methods 500-900 discussed below).

Figure 5:
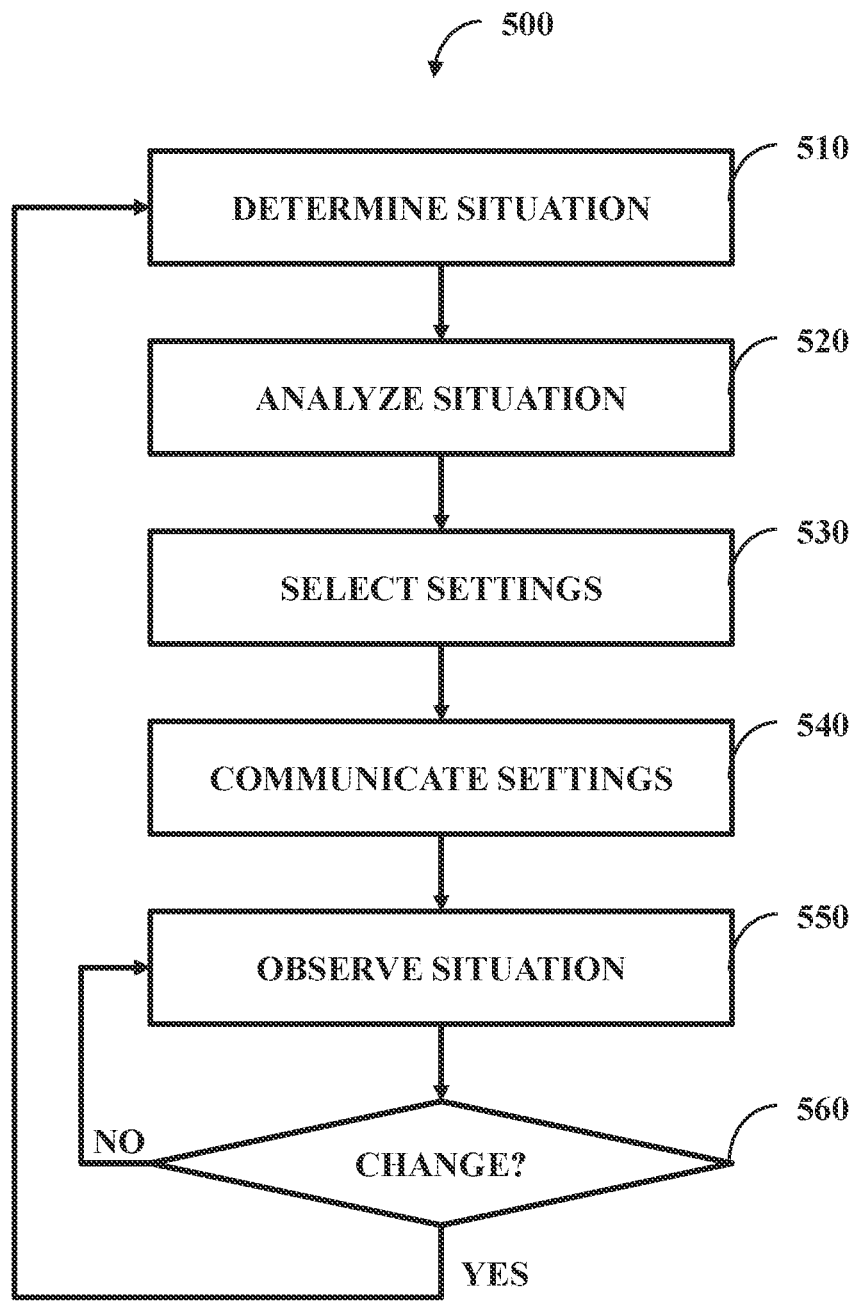
FIG. 5 illustrates one embodiment of a method comprising six actions.

FIG. 5 illustrates one embodiment of a method 500 comprising six actions 510-560. At 510, a determination can be made an initial communication situation for a geographical area. This can be accomplished through a first instance of aperiodic sampling. Examples of sampling include accessing the database 230 of FIG. 1 to obtain a record, using artificial intelligence/machine learning to analyze collected samples, or operating a scanner.

At 520 an analysis can occur of the initial communication situation to produce an initial analysis result. At 530, selecting an initial operational setting for the radio 130 of FIG. 1 can take place, with this selection being based, at least in part, on the initial analysis result. At 540, the initial operational setting can be communicated to the radio 130 of FIG. 1 (e.g., from an outside location to the radio 130 of FIG. 1 or from a first location inside the radio 130 of FIG. 1 to a second location inside the radio 130 of FIG. 1).

At 550, the communication situation can be observed for a change. At 560, a check can determine if this communication situation for the geographical area has changed. If the communication situation has not changed, then observation can continue at 550. If the communication situation has changed, then the method 500 can return to 510 to determine a subsequent communication situation for the geographical area, such as determining what changed. At 520, analyzing the subsequent communication situation can occur to produce a subsequent analysis result. At 530, selecting a subsequent operational setting for the radio 130 of FIG. 1 can take place, with the selection being based, at least in part, on the subsequent analysis result. The subsequent operational setting can be communicated to the radio 130 of FIG. 1 and implemented. The method 500 can continue to observe at 550 and check 560 for further changes.

Returning to the Tanzania example, when the radio 130 of FIG. 1 enters Tanzania, actions 510-540 can produce an operational setting for the radio 130 of FIG. 1. However, the situation in Tanzania can change. In one example, radios in Tanzania can operate in a frequency band between 20 kHz to about 300 gigahertz (GHz). The operational frequency 130A of FIG. 1 can be selected as 100 GHz. A set of radios can stop operating in Tanzania, such as the radios operating between 200-300 GHz. While the initial communication situation and the subsequent communication situation are different, the method 500 can determine that the initial operational setting and the subsequent operational setting should be the same. With this, the operational frequency 130A of FIG. 1 can continue being 100 GHz since it is within 200 GHz and 20 kHz.

At a later time, a further set of radios can stop operating in Tanzania; this time radios from 50 GHz to 200 GHz stop functioning. Now, the radio 130 of FIG. 1 is clearly an outlier with the operational frequency 130A of FIG. 1 being 100 GHz, well over the upper band level of 50 GHz. At 510, the change of the frequency range can be determined and at 520 analysis can occur to determine that the frequency range has an upper band of 50 GHz while the radio 130 of FIG. 1 operates at 100 GHz. At 530, the subsequent operational setting can be set at 10 GHz from the recent initial operational setting of 200 GHz, and thus the operational settings are different. The selection of 10 GHz can be communicated, at 540, to the radio 130 of FIG. 1 and the radio 130 of FIG. 1 can set the operational frequency 130A to 10 GHz.

Actions 510, 550, and 560 can address active observation or passive observation. In an example of active observation, at action 550, an active scan can be performed to determine the communication situation. In an example of a passive observation, at action 550, a record can be read. With this, a central repository can keep a record that pertains to the communication situation of the geographical area, such as by a dedicated scanning radio. When this record changes, the method 500 can read the changed record at 550 and determine if change should take place at 560. Similarly, upon entering the geographical area, at 510, the record can be read to determine the communication situation at 510.

Figure 6:
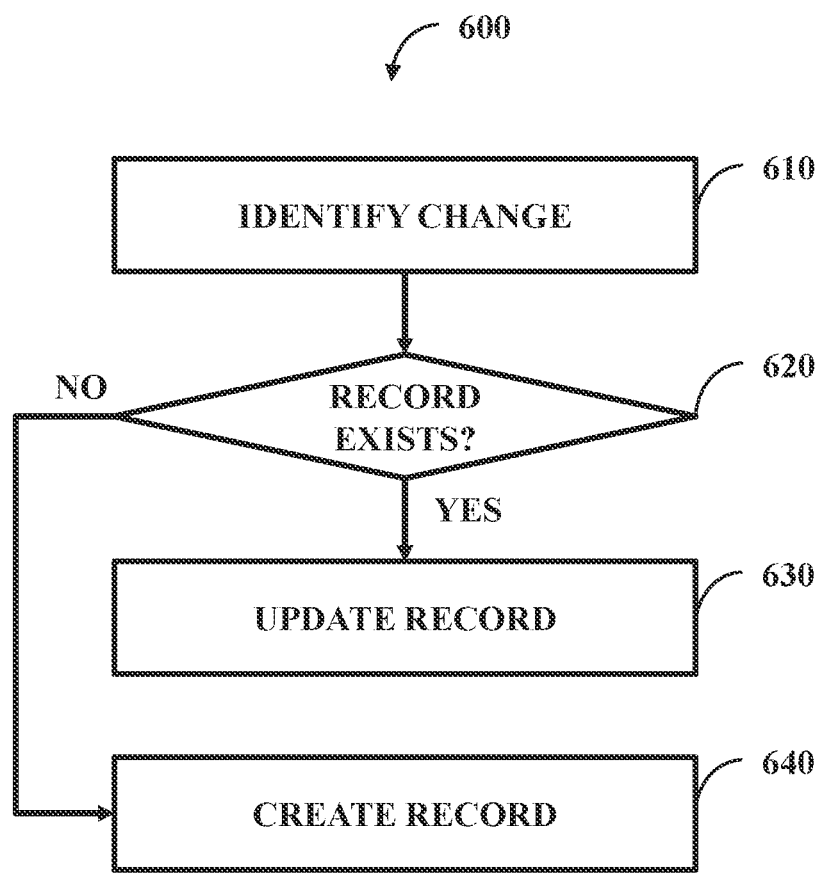
FIG. 6 illustrates one embodiment of a method comprising four actions.

FIG. 6 illustrates one embodiment of a method 600 comprising four actions 610-640. When the communication situation changes, a record that pertains to the communication situation can be updated in accordance with the method 600. At 610, a change in the communication situation can be identified. At 620, a check can take place on whether the record that pertains to the communication situation exists. If the record exists, then at 630 there can be a phenomena causing the record to be subjected to an update such that the initial operational setting is replaced with the subsequent operational setting in the record (e.g., 100 GHz is replaced with 10 GHz). If the record does not exist (e.g., the change is discovery of the communication situation), then at 640 the record can be created. With either 630 or 640, the method 600 can return to 610 to monitor and identify a change in the communication situation.

As an example, a first radio can scan Tanzania and create a record of the communication situation locally as well as send the record to the database 230 of FIG. 2. The first radio can read the local record to determine an initial operational setting for implementation. The first radio can continue the scan of Tanzania and determine a change in the communication situation. In response to the change, the first radio can update its operational setting as well as cause the record to be update the changed communication situation.

Upon entering Tanzania, a second radio can initially communicate with the first radio and gain access to the updated record. The second radio can read the updated record for its own initial communication situation and select its own initial operational setting. In view of this, the first radio and the second radio have different initial communications situations and in turn different initial operational settings.

With multiple radios operating, various configurations can keep the record updated. In one embodiment, the record is stored in a central repository with the first radio and second radio having equal updating capabilities. In one embodiment, the first radio is the master radio 320 of FIG. 3 and the second radio is the slave radio 330 of FIG. 3; the first radio can update the record, but the second radio cannot. In one embodiment, a separate entity manages updating the record. In one example, as the first radio and second radio move around, they can make different determinations. The separate entity (or one of the radios) can determine that they occupy two distinguishable geographical areas and decide to create two records. When a new radio enters Tanzania, the separate entity can decide which geographical area should be applied to the new radio. As an example, the two distinguishable geographical areas can have an overlap and based on likely travel the separate entity can supply one record over another.

Figure 7:
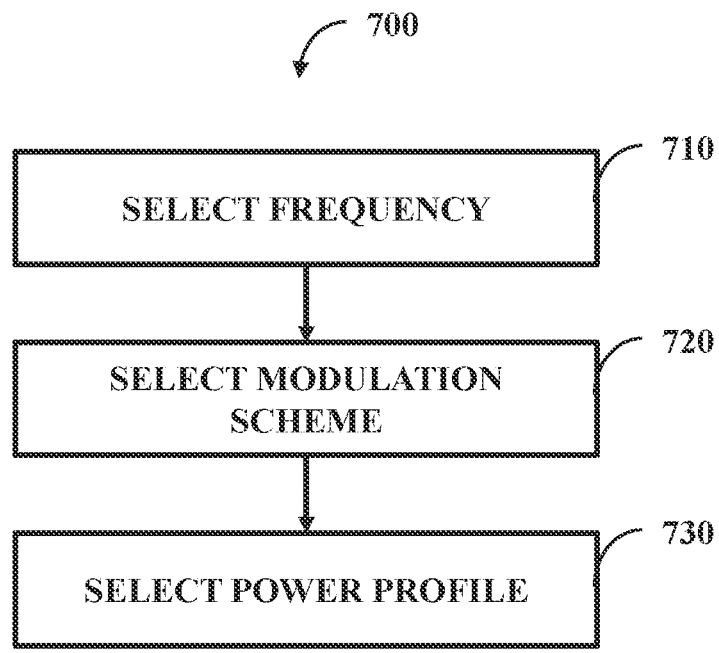
FIG. 7 illustrates one embodiment of a method comprising three actions.

FIG. 7 illustrates one embodiment of a method 700 comprising three actions 710-730. At 710, selection of a frequency for the radio 130 of FIG. 1 to employ occurs. At 720, selection of a modulation scheme for the radio 130 of FIG. 1 to employ occurs. At 730, selection of a power profile for the radio 130 of FIG. 1 to employ occurs. The actions 730 can function multiple times as the communication situation changes, such as from an initial communication situation to a subsequent communication situation.

In one example, the subsequent communication situation result from an addition of a radio subset to the radio set 120 of FIG. 1. The radio subset can increase a frequency range, a modulation scheme option set, and a power profile window for the radio set 120 of FIG. 1. Focusing on the increased frequency range, the radio set 120 of FIG. 1 can initially have a frequency range of 3 kHz to 9 kHz, so at 710 a frequency of 6 kHz can be selected for the radio 130 of FIG. 1. When the radio subset is added to the radio set 120 of FIG. 1, such as when a new manufacturer enters the Tanzania market, the range can increase from 3 kHz to 15 kHz.

The analysis component 140 of FIG. 1 can identify that the frequency set 120A of FIG. 1 moves from 3 kHz to 9 kHz into 3 kHz to 15 kHz. The analysis component 140 of FIG. 1 can compare the operational frequency 130A of FIG. 1 against the moved frequency range to determine that the operational frequency 130A of FIG. 1 still falls within the frequency set 120A of FIG. 1. The selection component 150 of FIG. 1, when performing the action 710 (e.g., concurrently with performing actions 720 and 730), can decide if selection should occur. In one embodiment, since the frequency 6 kHz falls between 3 kHz to 15 kHz, no change occurs. However, if the system 110 of FIG. 1 functions for the operational frequency 130A of FIG. 1 to be central, at 710 the operational frequency 130A of FIG. 1 can be 9 kHz to be in the middle of 3 kHz to 15 kHz.

In one example, the initial communication situation changes to the subsequent communication situation without a change to the membership of the radio set 120 of FIG. 1. The radio set 120 can receive an instruction from a central manager to no longer use a particular modulation scheme. With this, the modulation scheme set 120B changes and it can so happen that the modulation scheme 130B is no longer present in the modulation scheme set 120B. In response to this, at 720, a subsequent modulation scheme can be selected that compliments the new modulation scheme set.

In another example, the individual radios of the radio set 120 of FIG. 1 can provide employ a first range of power settings. However, the individual radios can communicate with one another and collectively decide, such as through employment of an artificial intelligence technique, to lower the power profile. In this example, the power setting 130C can go from being in the middle of a range of the power profile 120C to being at the upper end. The analysis component 110 of FIG. 1 can decide that while being at the upper end is within the power profile 120C, it would be wise to not be at the edge. Therefore, the analysis component 140 of FIG. 1 can instruct the selection component 150 of FIG. 1 to perform action 730 and select a subsequent power level for the radio 130 of FIG. 1.

Figure 8:
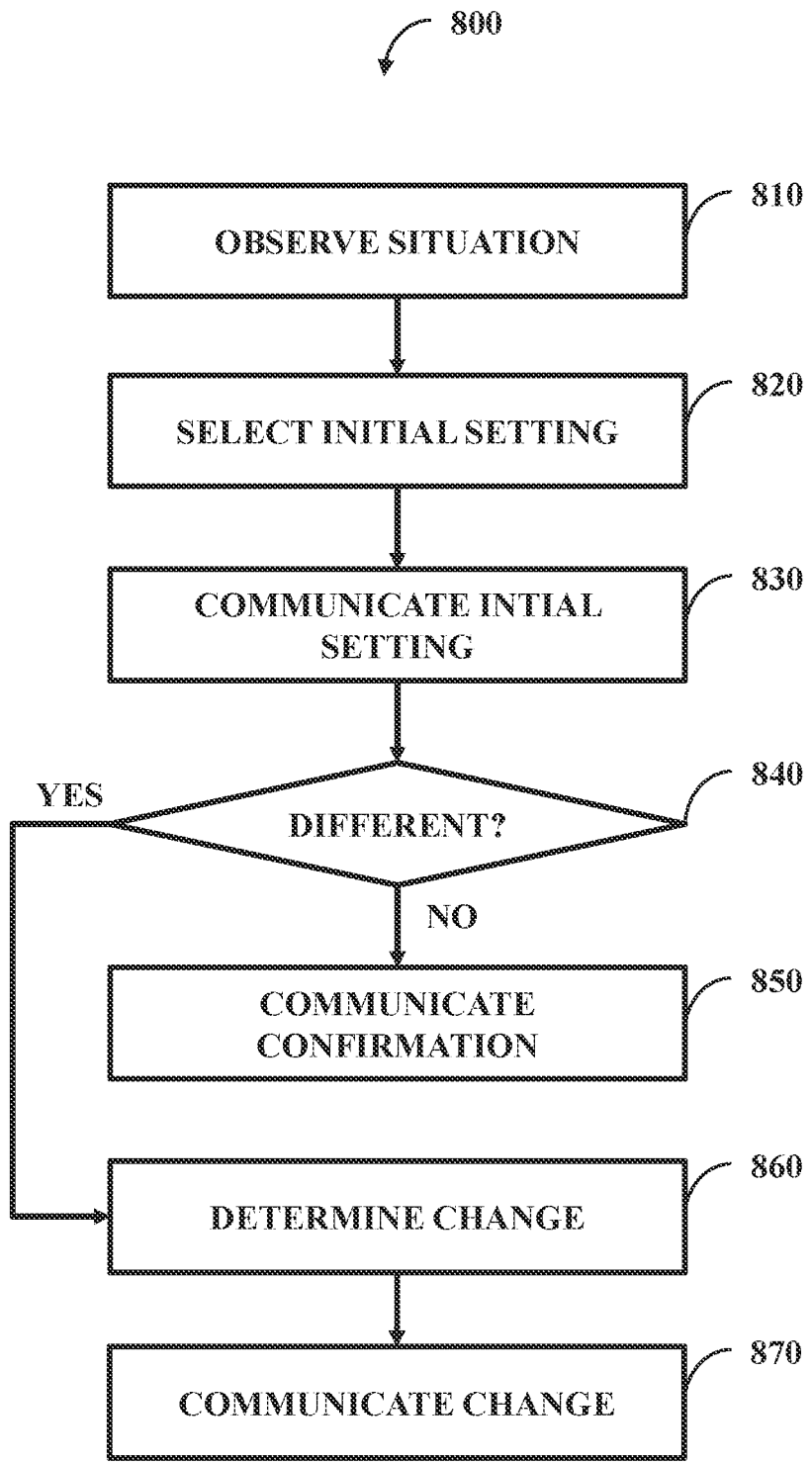
FIG. 8 illustrates one embodiment of a method comprising seven actions.

FIG. 8 illustrates one embodiment of a method 800 comprising seven actions 810-850. The method 800 can be how the master radio 320 of FIG. 1 can operate when the master radio 320 of FIG. 1 incorporates the decision engine 310 of FIG. 1. The communication situation can be observed at 810 and an initial operational setting set can be selected at 820. At 830, the initial operational setting set can be communicated to the slave radio 330 of FIG. 3 (e.g., along with the master radio 320 of FIG. 3 implementing the initial operational setting for itself).

At 840, a check can take place to determine if there is a difference in the communication situation. This can be a check on if any difference exists or if the difference is not significant enough/does not merit a change in the initial operational setting. If there is no difference, then a communication confirmation can be communicated at 850; this communication confirmation can be a ping stating that the setting set should not change or be silence (e.g., unless another message is sent, do not change).

If there is a difference, then how to change the operational setting set can be determined at 860. At 870, the change in the operational setting set can be communicated to the slave radio 330 of FIG. 3 along with being implemented by the master radio 320 of FIG. 3 itself. Further observing at 810 and difference checking at 840 can take place for further refinement of the operational setting set.

Figure 9:
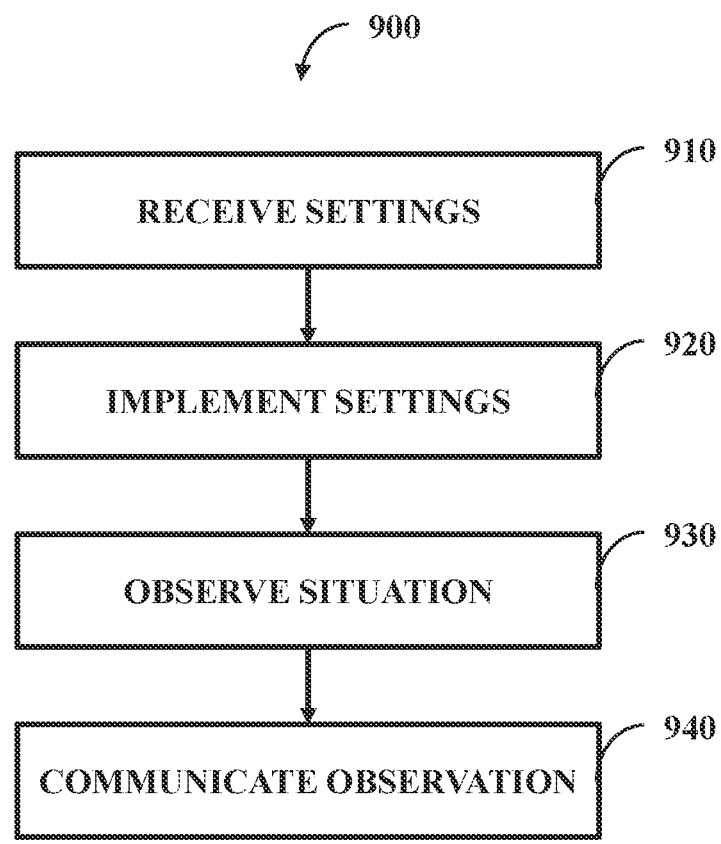
FIG. 9 illustrates one embodiment of a method comprising four actions.

FIG. 9 illustrates one embodiment of a method 900 comprising four actions 910-940. The method 900 can be how the slave radio 330 of FIG. 3 functions or how the radio 130 of FIG. 1 can function with the system 110 of FIG. 1 being separate. At 910, the slave radio 330 of FIG. 3 can receive the operational setting set. The slave radio 330 of FIG. 3 can implement the operational setting set.

The slave radio 330 of FIG. 3 can observe the communication situation at 930. At 940, the slave radio 330 of FIG. 3 can communicate the observation to the master radio 320 of FIG. 3, to the decision engine 310 of FIG. 3, or elsewhere.

In one example, a plurality of slave radios can be distributed in an area, with the individual radios making their own observations and reporting these observations back. The decision engine 310 of FIG. 3 can compile these observations and the analysis component 140 can perform its analysis on the compile observations.

Referring to the environment 300B of FIG. 3, the slave radios 330-1 to 330-3 of FIG. 3 can be geographically distributed, such as slave radio 330-1 having access to a sub-area not accessible by another radio. Using the 20 kHz to 300 GHz example from above, the slave radio 330-1 of FIG. 3 can observe a radio operating at 300 GHz and report this to the master radio 320 of FIG. 3. Based on this, the decision engine 310 can select the operational frequency 130A of FIG. 1 to be 100 GHz. The slave radio 330-1 of FIG. 3 can observe the radio operating at 300 GHz no longer operating and report this back; in response to this, the decision engine 310 of FIG. 3 can decide on a different operational frequency 130A of FIG. 1 to be 10 GHz.

While the methods disclosed herein are shown and described as a series of blocks, it is to be appreciated by one of ordinary skill in the art that the methods are not restricted by the order of the blocks, as some blocks can take place in different orders.

Aspects disclosed herein can allow for a user to operate in a manner which does not bring attention to their transmission. Examples include law enforcement, relief workers, and the military.

For law enforcement, there can be a desire to operate in an incognito manner. From a broad standpoint, large criminal organizations can monitor communications of law enforcement. By not having outlying features, the law enforcement radios can be harder to track.

Similarly, before conducting a raid, law enforcement can benefit having an operational setting that is not detectable and therefore not monitored. Additionally, scanning a local area occupied by criminal elements can also give insight into the criminal element itself. As an example, the transmission level used by one criminal element can indicate the transmission level used by others; this can make it easier for law enforcement to find other criminal elements.

For relief workers, a group of first responders can enter a mountainous area. The first responders may not know what frequencies work best in the area. While working with local authorities on proper coordination techniques, the first responders are able to scan the area and allow their radios to fit in, as time can be of the essence. This fitting in gives a relatively high likelihood of success that communications will be successful since that is what the local radios use.

For the military, there can be times they do not want to fit into the local radio network. As an example, in a humanitarian crisis, the military can desire not to use the local frequency band so as to not occupy the bandwidth of the local authorities. Therefore, the selection component 150 of FIG. 1, can select an operational setting that does not compliment that of the radio set 120 of FIG. 1, but instead is intentionally disruptive.

What is claimed is:

1. A system, comprising:
an analysis component configured to perform an analysis on a communication situation for a geographical area; and
a selection component configured to select an operational setting for a radio based, at least in part, on a result of the analysis,
where the radio operates with the operational setting while being physically located in the geographical area,
where the communication situation comprises what frequency set is used by a radio set within the geographical area,
where the radio is not part of the radio set,
where the operational setting comprises an operational frequency of the radio,
where the operational frequency compliments the frequency set,
where the frequency set has an upper frequency level and a lower frequency level,
where the operational frequency is lower than the upper frequency level, and
where the operational frequency is higher than the lower frequency level.

2. The system of claim 1, comprising:
a record component configured to create a record of the communication situation for the geographical area,
where the radio is a first radio and
where a second radio employs the record for an operational setting of the second radio.

3. A system, comprising:
an analysis component configured to perform an analysis on a communication situation for a geographical area; and
a selection component configured to select an operational setting for a radio based, at least in part, on a result of the analysis,
where the radio operates with the operational setting while being physically located in the geographical area,
where the communication situation comprises what modulation scheme set is employed by a radio set within the geographical area,
where the radio is not part of the radio set,
where the operational setting comprises a modulation scheme of the radio, and
where the modulation scheme of the radio compliments the modulation scheme set that is employed by the radio set.

4. The system of claim 3, comprising:
a record component configured to create a record of the communication situation for the geographical area,
where the radio is a first radio and
where a second radio employs the record for an operational setting of the second radio.

5. A system, comprising:
an analysis component configured to perform an analysis on a communication situation for a geographical area; and
a selection component configured to select an operational setting for a radio based, at least in part, on a result of the analysis,
where the radio operates with the operational setting while being physically located in the geographical area,
where the communication situation comprises a power profile of a radio set within the geographical area,
where the radio is not part of the radio set,
where the operational setting comprises a power setting of the radio, and
where the power setting of the radio compliments the power profile.

6. The system of claim 5, comprising:
a record component configured to create a record of the communication situation for the geographical area,
where the radio is a first radio and
where a second radio employs the record for the operational setting of the second radio.

7. A system, comprising:
an analysis component configured to perform an analysis on a communication situation for a geographical area; and
a selection component configured to select an operational setting for a radio based, at least in part, on a result of the analysis,
where the radio operates with the operational setting while being physically located in the geographical area,
where the communication situation comprises what frequency set is used by a radio set within the geographical area, what modulation scheme is employed by the radio set within the geographical area, and what a power profile is employed by the radio set within the geographical area,
where the radio is not part of the radio set, and
where the operational setting comprises an operational frequency of the radio that compliments the frequency set, a modulation scheme of the radio that compliments the modulation scheme that is employed as part of the radio set, and a power setting of the radio that compliments the power profile.

8. The system of claim 7, comprising:
a record component configured to create a record of the communication situation for the geographical area,
where the radio is a first radio and
where a second radio employs the record for an operational setting of the second radio.

9. A method, comprising:
determining an initial communication situation for a geographical area;
analyzing the initial communication situation to produce an initial analysis result
selecting an initial operational setting for a radio based, at least in part, on the initial analysis result;
communicating the initial operational setting to the radio;
determining a subsequent communication situation for the geographical area;
analyzing the subsequent communication situation to produce a subsequent analysis result;
selecting a subsequent operational setting for the radio based, at least in part, on the subsequent analysis result; and
communicating the subsequent operational setting to the radio,
where the initial communication situation and the subsequent communication situation are different and
where the initial operational setting and the subsequent operational setting are the same.

10. The A method, comprising:
determining an initial communication situation for a geographical area;
analyzing the initial communication situation to produce an initial analysis result selecting an initial operational setting for a radio based, at least in part, on the initial analysis result;
communicating the initial operational setting to the radio;

determining a subsequent communication situation for the geographical area;

analyzing the subsequent communication situation to produce a subsequent analysis result;

selecting a subsequent operational setting for the radio based, at least in part, on the subsequent analysis result and communicating the subsequent operational setting to the radio, where the initial operational setting and the subsequent operational setting are different, where the initial communication situation and the subsequent communication situation have a difference between them, where the initial communication situation comprises an initial frequency set that is employed by a radio set within the geographical area, where the radio is not part of the radio set, where the initial operational setting comprises an initial operational frequency for the radio, where the initial operational frequency compliments the initial frequency set, where the subsequent communication situation comprises a subsequent frequency set that is used by the radio set within the geographical radio after using the initial frequency set, and where the subsequent operational setting comprises a subsequent operational frequency for the radio after the radio operates with the initial operational frequency, where the initial frequency set functions in a frequency band with an initial limit set, where the initial limit set comprises an initial upper frequency level and an initial lower frequency level, where the initial operational frequency falls within the initial limit set, where the difference is that the initial frequency set no longer uses a specific frequency such that the initial limit set is contracted to a subsequent limit set, and where the subsequent operational frequency falls within the subsequent limit set.

11. The method of claim 10, where the initial frequency set functions in a frequency band with the initial limit set, where the initial limit set comprises the initial upper frequency level and the initial lower frequency level, where the initial operational frequency falls within the initial limit set, where the difference is that the initial frequency set uses an additional frequency such that the initial limit set is expanded to the subsequent limit set, and where the subsequent operational frequency falls within the subsequent limit set that was outside the initial limit set.

12. The method of claim 11, where the initial communication situation and the subsequent communication situation have the difference between them, where the initial communication situation comprises an initial modulation scheme set that is employed by a radio set within the geographical area, where the difference is that the radio set experiences a modulation scheme chance such that the initial modulation scheme set converts to a subsequent modulation scheme set, where the radio is not part of the radio set, where the initial operational setting comprises a modulation scheme for the radio that compliments the initial modulation scheme set, and where the subsequent operational setting comprises a modulation scheme for the radio that compliments the subsequent modulation scheme set.

13. The method of claim 12, where the initial communication situation and the subsequent communication situation have the difference between them, where the initial communication situation comprises an initial power profile range that is employed by a radio set within the geographical area, where the radio is not part of the radio set, where the initial operational setting comprises an initial power level for the radio, where the initial power level compliments the initial power profile range, where the subsequent communication situation comprises a subsequent power profile range that employed by the radio set within the geographical radio after using the initial power profile range, and where the subsequent operational setting comprises a subsequent power level for the radio after the radio operates with the initial power level.

14. A method, comprising:

determining an initial communication situation for a geographical area;

analyzing the initial communication situation to produce an initial analysis result; selecting an initial operational setting for a radio based, at least in part, on the initial analysis result;

communicating the initial operational setting to the radio;

determining a subsequent communication situation for the geographical area;

analyzing the subsequent communication situation to produce a subsequent analysis result;

selecting a subsequent operational setting for the radio based, at least in part, on the subsequent analysis result; and communicating the subsequent operational setting to the radio, where the initial operational setting and the subsequent operational setting are different, causing a record to be subjected to an update such that the initial operational setting is replaced with the subsequent operational setting in the record, where the determining of an initial communication situation for the geographical area occurs by reading the record before the update, where the radio is a first radio, where the initial operational setting is a first initial operational setting, where the initial communication situation is a first initial communication situation, and where a determination is made for a second initial communication situation of a second radio by reading the record after the update such that the second initial operational setting is different from the first initial operational setting.

15. A system, comprising:

a processor; and a non-transitory computer-readable medium communicatively coupled to the processor, where the non-transitory computer-readable medium stores a command set executable by the processor, where execution of the command set effectuates operation of a component set, where the component set comprises a reception component configured to obtain an operational setting set for a radio that is based, at least in part, on a communication situation for a geographical area, where the component set comprises a function component configured to implement the operational setting set upon the radio, where the component set comprises a transfer component configured to cause the radio, which is a master radio, to transfer the operational setting set to a slave radio, where the reception component and the function component are resident upon the radio and where the slave radio implements the operational setting set.

16. A system, comprising:

a processor; and a non-transitory computer-readable medium communicatively coupled to the processor, where the non-transitory computer-readable medium stores a command set executable by the processor, where execution of the command set effectuates operation of a component set, where the component set comprises a reception component configured to obtain an operational setting set for a radio that is based, at least in part, on a communication situation for a geographical area, and where the component set comprises a function component configured to implement the operational setting set upon the radio, where the reception component and the function component are resident upon the radio and where the operational setting set comprises a frequency set, a modulation scheme set, and a power settings set.

* * * * *